US012168282B1

(12) United States Patent
Hirshburg

(10) Patent No.: US 12,168,282 B1
(45) Date of Patent: Dec. 17, 2024

(54) SOCKET BREAK TOOL

(71) Applicant: Keith Hirshburg, Simpsonville, SC (US)

(72) Inventor: Keith Hirshburg, Simpsonville, SC (US)

( * ) Notice: Subject to any disclaimer, the term of this patent is extended or adjusted under 35 U.S.C. 154(b) by 620 days.

(21) Appl. No.: 16/653,289

(22) Filed: Oct. 15, 2019

Related U.S. Application Data

(60) Provisional application No. 62/745,531, filed on Oct. 15, 2018.

(51) Int. Cl.
*B25B 19/00* (2006.01)
*B25B 13/04* (2006.01)
*B25B 13/48* (2006.01)
*B25B 23/00* (2006.01)

(52) U.S. Cl.
CPC .............. *B25B 19/00* (2013.01); *B25B 13/04* (2013.01); *B25B 13/48* (2013.01); *B25B 23/0014* (2013.01)

(58) Field of Classification Search
CPC ..... B25B 19/00; B25B 23/16; B25B 23/0035; B25B 23/0014; B25B 13/04; B25B 13/48; B25D 1/16
See application file for complete search history.

(56) References Cited

U.S. PATENT DOCUMENTS 1,743,505 A * 1/1930 Turgeon .................. B25B 19/00 173/93.7
1,850,239 A * 3/1932 McCarthy ............... B25B 19/00 173/93
1,923,122 A * 8/1933 Smith ..................... B25B 21/02 173/93
3,273,428 A 9/1966 Rudeke
3,675,515 A 7/1972 Berg
4,364,440 A 12/1982 Clar
4,748,878 A 6/1988 Chen
4,864,902 A 9/1989 Doorley
5,109,739 A 5/1992 Hull
5,161,440 A * 11/1992 Jordan .................... B25B 13/04 81/463
5,503,050 A * 4/1996 Stoev ...................... B25B 19/00 81/177.5
6,085,621 A * 7/2000 Nezigane ................ B25B 19/00 81/465
6,502,485 B1 1/2003 Salazar
6,748,833 B2 * 6/2004 Williams ................ B25B 19/00 81/465
6,769,334 B1 * 8/2004 Whitehead .............. B25B 19/00 81/177.85
6,814,159 B1 11/2004 Huang
(Continued)

FOREIGN PATENT DOCUMENTS

CN 202388419 12/2011

OTHER PUBLICATIONS https://www.toolsource.com/striking-slugging-c-1994_224_2281/; ToolSource: publisehd Sep. 4, 2018.
(Continued)

*Primary Examiner* — David B. Thomas
(74) *Attorney, Agent, or Firm* — Thrive IP

(57) ABSTRACT

A hand tool where one end of the tool has a force applied along a linear handle and a socket engaging tool head on the opposite end of the linear handle to direct the force to rotate a stuck fastener engaged bolt by the tool head.

8 Claims, 6 Drawing Sheets

(56) References Cited

U.S. PATENT DOCUMENTS

| | | | | |
|---|---|---|---|---|
| 7,044,035 | B2 | 5/2006 | Pregeant | |
| 7,051,628 | B2 | 5/2006 | Wilson | |
| 7,089,833 | B2 * | 8/2006 | Hamann | B25B 19/00 81/180.1 |
| 7,194,938 | B2 | 3/2007 | Hollar | |
| 7,497,147 | B2 | 3/2009 | Koppenhoefer | |
| 8,272,299 | B2 * | 9/2012 | Urick, Sr. | B25B 19/00 81/121.1 |
| 10,065,454 | B2 * | 9/2018 | Coetzee | B60B 29/005 |
| 10,220,492 | B2 * | 3/2019 | Borders | B25B 19/00 |
| 10,661,415 | B1 * | 5/2020 | Roche | B25B 21/02 |
| 2011/0088520 | A1 * | 4/2011 | Albrecht | B25B 19/00 81/124.7 |
| 2014/0373686 | A1 | 12/2014 | Idir et al. | |
| 2015/0183104 | A1 * | 7/2015 | Patterson | B25B 19/00 81/25 |
| 2016/0046147 | A1 | 2/2016 | Coetzee et al. | |

OTHER PUBLICATIONS https://store.snapon.com/Impact-Driver-Set-1-2-1-2-Driver.P632632.aspx Sanp-On Sep. 4, 2018.

* cited by examiner

SOCKET BREAK TOOL

RELATED APPLICATIONS

This application claims the benefit of U.S. Provisional Application Ser. No. 62/745,531 filed on Oct. 15, 2018 and which is incorporated herein by reference.

FIELD OF THE INVENTION

This invention is directed towards a socket break apparatus and a process of using the apparatus that is adapted for receiving a striking force applied onto a base of a handle, the striking force then being transferred to a socket that engages a stuck bolt or fastener.

Auto mechanics and other users of hand tools frequently encounter a bolt that may be stuck or in such a position that a traditional tool will not provide an adequate break force to release the bolt. At times, the inability to provide a break force is result of a very tight clearance that limits the access of a tool or the ability to direct manual force in the appropriate direction. In response to a stuck bolt, people may resort to using a breaker bar or a hammer blow delivered on a ratchet or other tool in an effort to free the stuck bolt. This often results in damage to the tool.

BACKGROUND OF THE INVENTION

The prior art does provide some specialized tools or products that are designed to address a problem of a stuck bolt. These include: U.S. Pat. No. 7,051,628 Impact Wrench; US Publication No. US20160046147 An Assembly for Loosening or Tightening Mechanical Nuts; US Publication No. US20140373686 Slogging Wrench; U.S. Pat. No. 6,502,485 Impact Ratchet Wrench; U.S. Pat. No. 5,109,739 Slide Hammer Tool; U.S. Pat. No. 6,814,159 Impact Tool Driver; U.S. Pat. No. 7,044,035 Hammer Wrench Assembly and Method of Use; U.S. Pat. No. 7,194,938 Angular Impact Wrench; U.S. Pat. No. 7,497,147 Torque Tool for Tightening or Loosening Connections, and Method of Tighten Loosening the Same; U.S. Pat. No. 4,864,902 Socket Wrench Slugging Device; U.S. Pat. No. 4,748,878 Impact Socket Wrench or an Attachment Assembly with Hammering Effect; U.S. Pat. No. 4,364,440 Hand Held Rotary Impact Tool; U.S. Pat. No. 3,675,515 High Energy Impact Wrench Assembly; Chinese 202388419 Knocking Wrench and U.S. Pat. No. 3,273,428 Mechanical Nut Driving Wrench.

While the above references, all of which are incorporated herein by reference, may provide a limited solution for certain unique situations, none provide for a general purpose socket tool that is specially adapted for removing a stuck bolt in a wide variety of situations. Accordingly, there is room for variation and improvement in the art.

SUMMARY OF THE INVENTION

It is one aspect of at least one of the present embodiments to provide a hand tool comprising:

a socket head, the socket head configured to engage an exposed or embedded fastener head, the socket head having an angled head portion;

a handle attached to the socket head, the handle being pivotable relative to the socket head;

wherein, when a free end of the handle has applied thereto a force directed along an axial direction of the handle, the force is transmitted as torque to the socket head.

It is a further aspect of at least one embodiment of this invention to provide a process of removing a stuck fastener comprising the steps of supplying a hand tool having an axial shaped handle having a first end adapted for receiving an impact blow, a second end configured to attach via a pivot to a head portion, the head portion defining an opening therein for receiving a fastener head, the tool head portion being positionable at a selected angle of between about 65 degrees to about 179 degrees relative to an axis of the handle; engaging a fastener with the head portion of the hand tool;

striking an impact blow to a first end of the handle, the impact of the blow being directed to the head portion of the tool which engages the fastener, thereby supplying a rotational force to the fastener to help loosen the fastener. supplying a hand tool having an axial shaped handle with a first end adapted for receiving an impact blow and a second end configured to attach via a pivot to a head engaging portion, the head engaging portion defining a shape adapted for engaging a fastener, the head engaging portion being positionable by the pivot relative to an axis of the handle;

It is a further aspect of at least one embodiment of this invention to provide a process of engaging a fastener with the head engaging portion of the hand tool;

striking an impact blow to a first end of the handle, the impact of the blow being directed to the head engaging portion of the tool which engages the fastener, thereby supplying a torque force to the fastener to helping loosen the fastener.

wherein the shape of the fastener further defines a recessed opening adapted for engaging a bolt.

It is a further aspect of at least one embodiment of this invention to provide a process of wherein the head engaging portion as described herein defines a projection, the projection adapted for engaging one of a screw slot, a Phillip's head slot, and a torx slot.

It is a further aspect of at least one embodiment of this invention to provide a process of wherein the head engaging portion as defined herein defines an open sided wrench face for engaging a portion of a bolt.

It is a further aspect of at least one embodiment of this invention to provide a process of wherein the head engaging portion as defined herein may be selected from a plurality of different head configurations, each of the plurality of head configurations being reversibly secured to the hand tool.

It is a further aspect of at least one embodiment of this invention to provide a process of wherein the head engaging portion as described herein may be removed from the hand tool.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

As used herein, the term "about" means plus or minus 10 percent of the stated value unless a more specific range is given.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Figure 1:
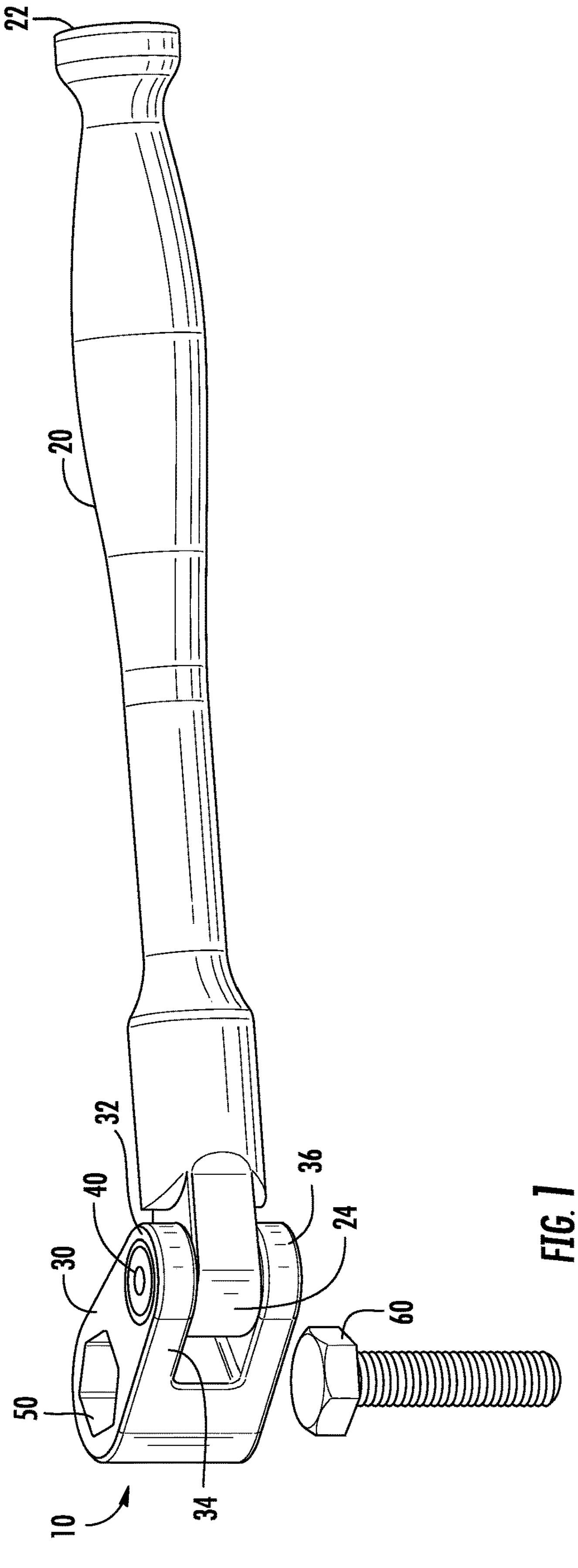
FIG. 1 is one embodiment of a socket break apparatus used to break loose a bolt or fastener.

As best seen in reference to FIG. 1, a socket break tool is provided having a substantially linear handle 20 having a free end 22 and defining an opposite end 24, end 24 being adapted for securing to a head portion 30. The head portion 30 further defines a yoke 32 having an upper edge 34 and a lower edge 36 to which handle end 24 can be inserted therebetween and securely connected in a pivoting fashion to the handle 20 using a pivot pin 40. The pivot pin 40 can assume a number of different configurations that are suitable for allowing the relative movement of the handle 20 with respect to the head portion 30. Head portion 30 further defines a receptacle 50 which is adapted for engaging a bolt 60.

In use, the head 30 is placed over a stuck bolt 60 such that the receptacle 50 is secured about the dimensions of the bolt head. Preferably, the orientation of the receptacle 50 relative to handle 20 is such that the head portion 30 that defines the receptacle 50 is set off at a 90 degree angle relative to the handle. While a 90 degree angle is preferred, angles between above 65 degrees and about 179 degrees can be operative though not preferred. However, within the tight confines, such as within an engine compartment of a vehicle, the preferred angle of 90 degrees may not be possible and a greater or lesser angle may be utilized.

Figure 2:
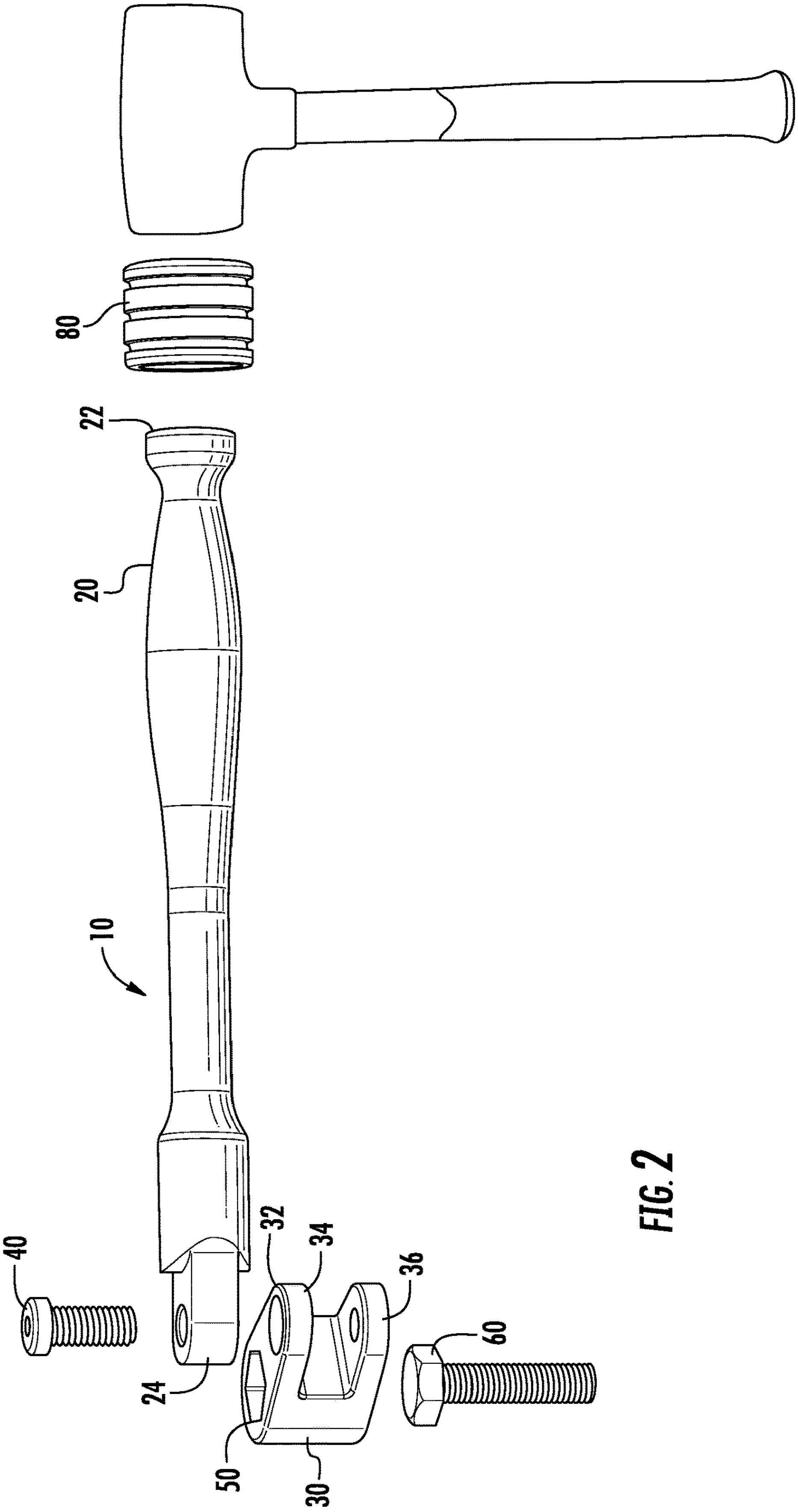
FIG. 2 is an exploded view detailing parts of one embodiment of a socket break tool and a process of using the tool using a striking unit and accessory item as placed over the handle of the tool for receiving a blow from the striking unit.

As seen in reference to FIG. 2, when a blow from a hammer is used to strike the tool 10 along the free end 22 of handle 20, the force is transmitted along the handle and to the head 30 which will apply a rotational force (torque) to the bolt head 60 which resides within receptacle 50. At a 90 degree angle, a maximum amount of the axial force, applied to the handle, can be transmitted as torque to the bolt 60. This tool and arrangement facilitates application of large forces to the bolt and bolt head 60.

When an angle of less than 90 degrees is utilized, it will require a greater impact in order to generate a comparable rotational force to the bolt 60. However, even at a less efficient transfer of force, the tool 10 provides for an improvement over other tools and techniques that are less efficient in applying rotational pressure or torque to a stuck bolt.

Figure 5A:
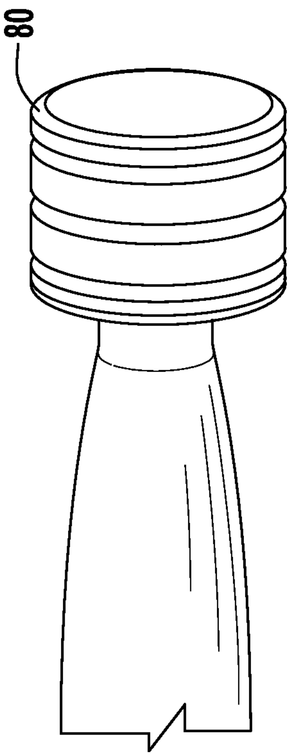
FIGS. 5A & 5B illustrates a striking cap that can be placed on the handle as either a detachable accessory or integral portion of the handle and is designed to prevent handle damage, or to extend the handle for greater flexibility for the item striking the handle.
Figure 5B:
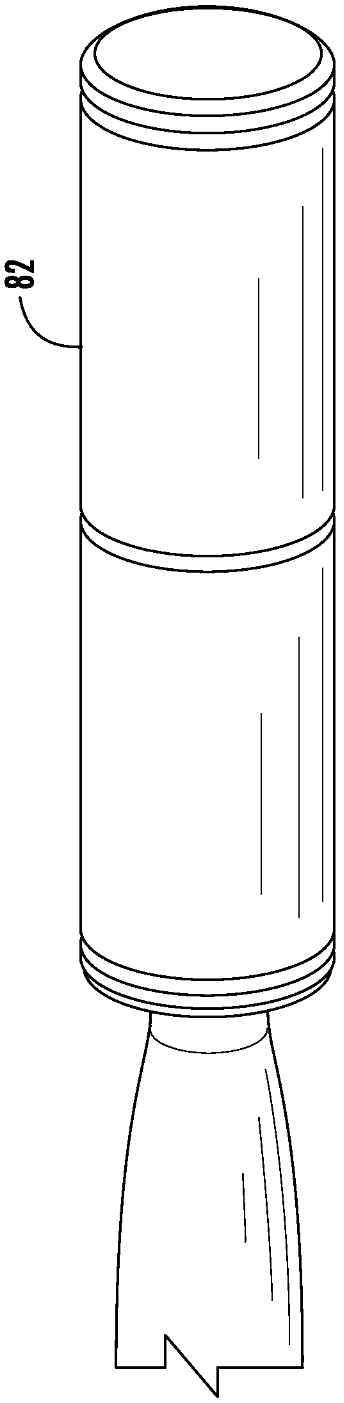

As seen in reference to FIG. 2, and FIGS. 5A and 5B an impact cap 80 can be positioned along the free end of the handle such that the cap 80 will receive a blow from a hammer and distribute the force axially along the handle. The use of the cap 80 provides for a larger target for the hammer. An additional embodiment as seen in FIG. 5B illustrates cap 82 which provides a greater working length to the tool 10.

Figure 3:
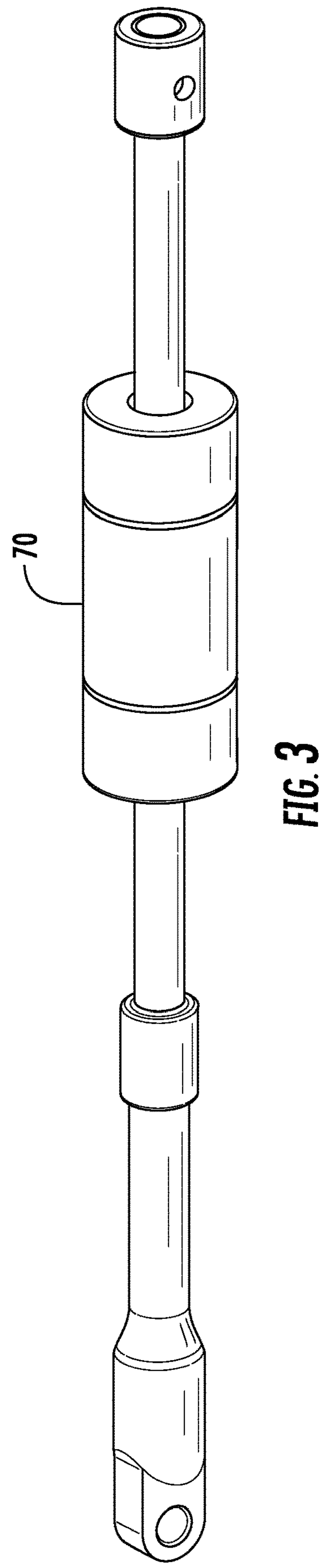
FIG. 3 illustrates a slide hammer handle embodiment in which the slide is used to transmit force to a bolt.

As seen in reference to FIG. 3, a slide hammer 70 can be utilized to transmit force along the handle to the bolt 60. Receptacle 50 can be configured to accommodate a large number of different fasteners including various shaped bolt heads, specialty fasteners, screws, and similar items. Additionally, receptacle 50 could be partially opened along one edge of head portion 30 to allow for an alternative placement of the head portion with respect to a stuck fastener. In a broad sense, receptacle 50 can define any structure which may engage a stuck fastener such as bolts, screws, rivets, and other similarly shaped fasteners having an established geometry to the fastener head.

Figure 4:
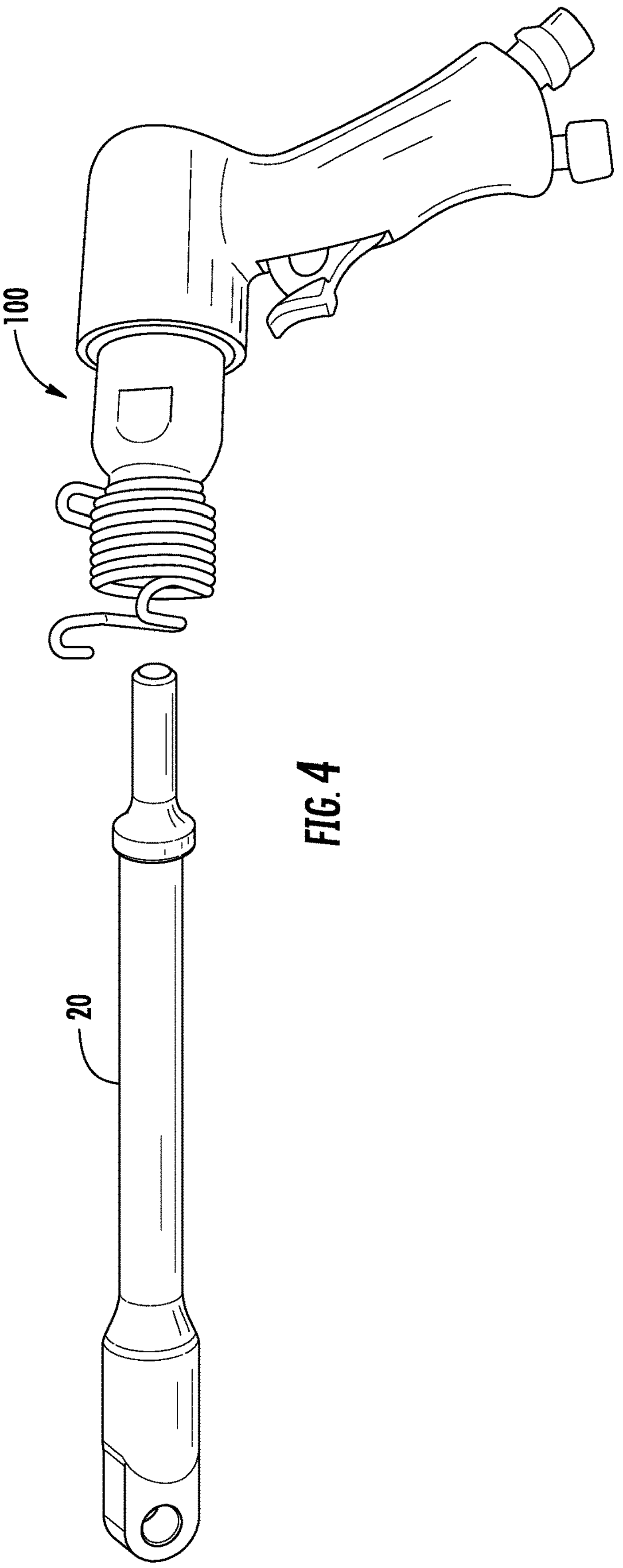
FIG. 4 illustrates an embodiment in which the tool is adapted for use with an air hammer.

As seen in reference to FIG. 4, an additional embodiment of the tool 10 can have the free end adapted for use with an air hammer 100 such that the impact of the air hammer is directed along the axial length of the handle.

Figure 6:
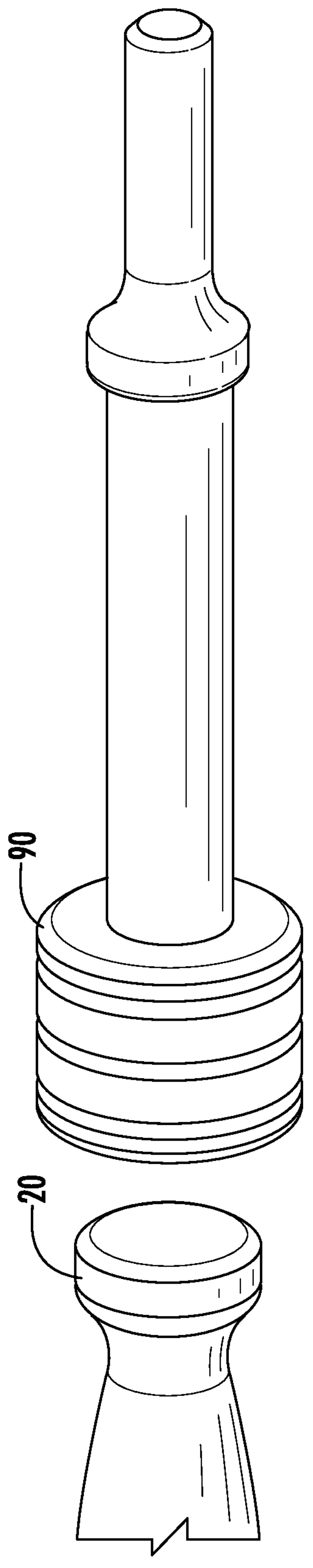
FIG. 6 illustrates a protective cap that can be placed as an accessory used within an air hammer that can be used to direct a force to the socket break apparatus.

As further seen in reference to FIG. 6, a protective cap 90 can be used with the air hammer to direct a force along the axial direction of the handle of the socket break tool 10.

As further seen in reference to FIG. 5B, a striking cap 82 can be configured such that it provides for an extension of the handle allowing a greater flexibility of use in certain environments. The extended height of a striking cap 82 can be utilized with both a manual or an air hammer embodiment of the socket break tool 10.

The tool is designed efficiently transfer a striking force along the axis of the handle such that the force is transferred to the head of the tool that is secured around a bolt or fastener. The angle between the linear handle and the socket engaging portion is such that a significant majority of the force of a hammer below will be transmitted in a rotational direction relative to stuck bolt or fastener which is engaged by the tool.

Socket break tool 10 is particularly useful for situations where there is a tight clearance that might prevent a user from being able to provide adequate force to a traditional socket. In addition, the tool, being specifically adapted for use with a hammer, prevents damage from occurring to more conventional socket designs which are not constructed or intended for use with an impact blow from a hammer applied to the handle. In addition, it prevents misuse and damage to other tools such as ratchets, ratcheting wrenches, hinge handles, breaker bars and normal wrenches by striking them.

The socket break apparatus and process can also include the use of an air hammer where needed or utilize other powered hammers and/or impact items using hydraulics, gravity, electric, riveter, jack hammer, explosion, hammer drill, water or linear actuator. In some embodiments, the tool head can be removed and replaced with a different size or type of tool head. For example, the receptacle portion of the tool can define an opening which will engage various shaped fastener heads such as a socket head or wrench. Other embodiments may provide a tool end that defines a projection adapted for engaging a flat head screw slot, a Phillip's head slot, a torx fastener or similar fastener which defines a recess for receiving a tool head.

There are a number of alternative embodiments directed to the construction of variations of the head, the fastener system, the handle, the connector, and various accessories that extend the utility and ease of use of the socket break apparatus and as illustrated and described in Applicant's priority application and which is incorporated herein by reference.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention. In addition, it should be understood that aspects of the various embodiments may be interchanged, both in whole, or in part. Therefore, the spirit and scope of the invention should not be limited to the description of the preferred versions contained therein.

That which is claimed:

1. A hand tool comprising:

a socket head, the socket head configured to engage an exposed or embedded fastener head, the socket head having an angled head portion;

a handle attached to the socket head, the handle being pivotable relative to the socket head, the handle further defining a slide hammer positioned along an axis of the handle;

wherein, when the handle has applied thereto a force directed along an axial direction of the handle, the force is transmitted as torque to the socket head.

2. A process of removing a stuck fastener comprising:

supplying a hand tool having an axial shaped handle having a first end adapted for receiving an impact blow, a second end configured to attach via a pivot to a head portion, the head portion defining an opening therein for receiving a fastener head, the tool head portion being positionable at a selected angle of between about 65 degrees to about 179 degrees relative to an axis of the handle, and a slide hammer positioned along an axis of the handle;

engaging a fastener with the head portion of the hand tool;

striking an impact blow using the slide hammer, the impact of the blow being directed to the head portion of the tool which engages the fastener, thereby supplying a rotational force to the fastener to help loosen the fastener.

3. A process of applying a torque force to a fastener comprising:

supplying a hand tool having an axial shaped handle with a first end adapted for receiving an impact blow and a second end configured to attach via a pivot to a head engaging portion, the head engaging portion defining a shape adapted for engaging a fastener, the head engaging portion being positionable by the pivot relative to an axis of the handle, and a slide hammer positioned along an axis of the handle;

engaging a fastener with the head engaging portion of the hand tool;

striking an impact blow using the slide hammer to a first end of the handle, the impact of the blow being directed to the head engaging portion of the tool which engages the fastener, thereby supplying a torque force to the fastener to helping loosen the fastener.

4. The process according to claim 3 wherein the shape of the fastener further defines a recessed opening adapted for engaging a bolt.

5. The process according to claim 3 wherein the head engaging portion defines a projection, the projection adapted for engaging one of a screw slot, a Phillip's head slot, and a torx slot.

6. The process according to claim 3 wherein the head engaging portion defines an open sided wrench face for engaging a portion of a bolt.

7. The process according to claim 3 wherein the head engaging portion may be selected from a plurality of different head configurations, each of the plurality of head configurations being reversibly secured to the hand tool.

8. The process according to claim 3 wherein the head engaging portion may be removed from the hand tool.

* * * * *